United States Patent Office 2,802,827
Patented Aug. 13, 1957

2,802,827

SULFUR CONTAINING BARBITURIC ACIDS

Otto Zima, Darmstadt-Eberstadt, and Fritz Von Werder, Darmstadt, Germany, assignors to Emanuel Merck, Darmstadt, Germany, a partnership No Drawing. Application January 27, 1954,
Serial No. 406,584

Claims priority, application Germany February 27, 1953

14 Claims. (Cl. 260—257)

This invention relates to barbituric acids. In particular, it is directed to novel barbituric acids and the water-soluble salts thereof, wherein the cationic portion of the salt is that of an inorganic or organic base, preferably alkali or alkaline earth salts. The free acid form of these novel compounds has the structural formula

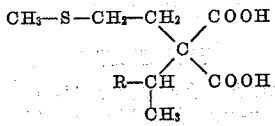

Formula I

Wherein R designates an alkyl radical having from 2 to 4 carbon atoms; Y designates oxygen or sulfur and X designates hydrogen or an alkyl radical.

The novel compounds of this invention possess especially good physiological properties as short duration narcotics.

In comparison with similar compounds heretofore known, the novel products of this invention containing the side-chain structure $CH_3$—S—$CH_2$—$CH_2$—, provide the advantage of better tolerance and increased liver protecting effect. Such advantages, it may be presumed, are due to the fact that a compound containing a side-chain of the structure $CH_3$—S—$CH_2$—$CH_2$— (analogous to that present in methionine) can be more easily and more readily decomposed or detoxified than compounds having the longer side-side chain $CH_3$—$CH_2$—S—$CH_2$—$CH_2$—.

The manufacture of the new compounds of this invention, is accomplished basically, in accordance with the methods known for synthesizing substituted barbituric acids or thiobarbituric acids, taking into account the requirement that there should be present in the final product at carbon atom 5, (1) a sulfur containing radical of the structure $CH_3$—S—$CH_2$—$CH_2$—, and (2) a radical of the formula R—CH($CH_3$)— wherein R is an alkyl radical of from 2 to 4 carbon atoms. Such structure is obtained by converting barbituric acid or thiobarbituric acid, if necessary through the intermediate products suitable for the synthesis of these substances by using methods suitable therefor, into such di-substituted barbituric acids and thiobarbituric acids which have at carbon atom 5 the radical $CH_3$—S—$CH_2$—$CH_2$— and a radical R—CH($CH_3$)—, wherein R is an alkyl radical having from 2 to 4 carbon atoms. The radical R can be either a normal (straight-chain) alkyl radical in the series $C_2H_5$ to $C_4H_9$ or a branched alkyl radical of formula $C_3H_7$ or $C_4H_9$.

The barbituric acids thus obtained react acidically due to their imino-nitrogen atom whereby they can be converted into salts of organic or inorganic bases (for example, alkali or alkaline earth salts preferably into water-soluble sodium salts).

The most important methods for manufacturing the novel products of this invention embraced within the scope of the above defined method are the following:

A di-substituted malonic acid of the formula

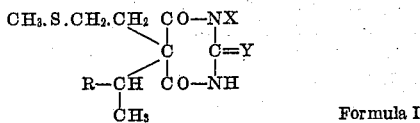

Formula II is condensed in a conventional manner with urea or thiourea, or the monoalkyl (preferably monomethyl) derivatives of said ureas to the corresponding barbituric acids and thiobarbituric acids. Alternatively the derivatives of the aforesaid malonic acids, as for examples the esters, amides, acid chlorides, nitriles, amide-ester, nitrile-ester, suitable for barbituric acid synthesis may be condensed in a conventional manner with urea, or thiourea, or the monoalkyl (preferably monomethyl) ureas to the corresponding barbituric acids and thiobarbituric acids. The derivatives of the mononitriles of the substituted malonic acids are designated mostly as cyanoacetic acids.

Instead of the urea and thiourea components of the above described condensation reactions, urea derivatives such as guanidine, isourea ether, dicyandiamidine and similar products may be used. In such cases there are obtained intermediate products which are then transformed in a conventional manner (for instance by hydrolysis of the imino or cyano groups), into such barbituric acids and thiobarbituric acids as are obtained by the methods first described.

In using the various methods above mentioned, if only a part of the desired substituents are present in the preliminary, or intermediate, or final products, the absent substituent or substituents (that is, the groups $$CH_3—S—CH_2—CH_2—$$

and R—CH($CH_3$)—) are introduced by a conventional procedure. The result is that one obtains the desired final product, corresponding to the generic structural formula above described or at least an intermediate product is obtained which can be transformed into the final desired product by conventional methods.

Among the compounds obtained in accordance with the procedures above described, the following deserve special mention:

5 - β-methylthioethyl-5-(1-methyl)-n-propyl-barbituric acid, a compound having the block formula $C_{11}H_{18}O_3N_2S$ having a melting point of 121° to 122° C.

5 - β-methylthioethyl-5-(1-methyl)-n-propyl-2-thiobarbituric acid, a compound having the block formula $C_{11}H_{18}O_2N_2S_2$ with a melting point of 113° C.

5-β-methylthioethyl-5-(1-methyl) - n - butyl barbituric acid, a compound having the block formula $C_{12}H_{20}O_3N_2S$ with a melting point of about 105° C.

5-β-methylthioethyl-5-(1-methyl)-n-butyl - 2 - thiobarbituric acid, a compound having the block formula $C_{12}H_{20}O_2N_2S_2$ with a melting point of about 79° to 81° C.

5 - β - methylthioethyl-5-(1-methyl)-isoamyl-barbituric acid, a compound having the block formula $C_{13}H_{22}O_3N_2S$ with a melting point of about 146° C.

5 - β - methylthioethyl - 5 - (1 - methyl) - isoamyl - 2 - thiobarbituric acid, a compound having the block formula $C_{13}H_{22}O_2N_2S_2$ with a melting point of about 143° C.

5 - β - methylthioethyl - 5 - (1 - methyl) - n - butyl - 3-methyl-barbituric acid, a compound having the block formula $C_{13}H_{22}O_3N_2S$ with a melting point of about 130° C.

5 - β - methylthioethyl - 5 - (1 - methyl) - n - butyl - 3-methyl-2-thiobarbituric acid, a compound having the block formula $C_{13}H_{22}O_2N_2S_2$ with a melting point of about 84° to 85° C.

The salts of the foregoing compounds can be produced in a conventional manner by reacting the particular barbituric acid with organic or inorganic bases. More specifically the water-soluble sodium salts which are especially suitable for therapeutic use are obtained by shaking the acids in an aqueous or alcoholic solution or by suspension with the equivalent amount of caustic soda.

The following are examples illustrative of this invention:

EXAMPLE 1

5-β-methyl-thio-ethyl-5-(1-methyl)-n-propyl-barbituric acid

This compound has the structural formula of Formula I wherein: R is $CH_3$—$CH_2$, X is H, and Y is O.

A solution of 99 grams of sodium in 2 liters of absolute alcohol is mixed with 721 grams of (1-methyl)-n-propyl-cyanoacetic acid-ethyl ester and the mixture heated to 75° C. while being stirred. Without adding further heat 525 grams of β-methyl-mercapto-ethyl chloride are added while the mass is being continuously stirred so that the reaction mixture continues mildly to boil. The entire mixture is then boiled under reflux with stirring for a period of six hours. On cooling the precipitated sodium chloride is filtered off and washed with absolute alcohol. The filtrate and the washings are condensed under vacuum, the residue being taken up in 2 liters of ether. The ether solution is washed three times, each time with 150 cc. of water, dried over sodium sulfate, filtered, concentrated and drawn off in vacuum. The residue is fractionated under vacuum whereby the β-methyl-thio-ethyl-(1-methyl)-n-propyl-cyanoacetic acid-ethyl ester passes over as a colorless oil at a pressure of 0.6 mm. of mercury at 129°–130° C.

A solution of 34.5 grams of sodium in 690 cc. of absolute alcohol, 122 grams of the β-methyl-thio-ethyl-(1-methyl)-n-propyl-cyanoacetic acid ethyl ester and 45 grams of urea are boiled for eight hours under reflux while stirring, and then concentrated under vacuum. The residue is dissolved in 900 cc. of water and the ether removed therefrom. The aqueous solution which has been freed from dissolved ether under vacuum is mixed with 300 cc. of glacial acetic acid added dropwise with stirring and cooling. The resulting precipitate is sucked off, washed with water and recrystallized from alcohol. There is thus obtained the β-methyl-thio-ethyl-(1-methyl)-n-propyl-cyano-acetyl-urea, in the form of colorless crystals, which melts at 252° C.

30 grams of this product are boiled for three hours under reflux with 300 cc. of 20% sulfuric acid.

The reaction mixture, after cooling is then extracted with ether. The ethereal extracts are combined, washed with water, dried over sodium sulfate, filtered, concentrated and the final traces of ether withdrawn under vacuum. The residue is recrystallized from benzene, whereby the 5-β-methyl-thio-ethyl-5-(1-methyl)-n-propyl-barbituric acid is obtained in the form of colorless crystals having a melting point of 121°–122° C. The sodium salt of this acid, obtained by the reaction thereof with caustic soda can be recrystallized from absolute alcohol.

EXAMPLE 2

5-β-methyl-thio-ethyl-5-(1-methyl)-n-propyl-2-thio-barbituric acid

This compound has the structural formula of Formula I wherein: R is $CH_3$—$CH_2$, X is H, and Y is S.

A mixture of a solution of 34.5 grams of sodium in 690 cc. of absolute alcohol with 122 grams of β-methyl-thio-ethyl-(1-methyl)-n-propyl-cyano-acetic acid ethyl ester and 57.1 grams of thiourea is boiled under reflux and while being stirred for eight hours. The further treatment is the same as has been described in Example 1. The β-methyl-thio-ethyl-(1-methyl)-n-propyl-cyano-acetyl-thiourea is obtained in the form of yellowish green crystals which melt at 238° C. after recrystallization from alcohol.

50 grams of this product are boiled for three hours under reflux with 1 liter of 20% sulfuric acid. After cooling the oily layer is taken up in ether, the ether solution is washed with water, dried, filtered and concentrated. The crystallized residue is recrystallized from benzene and produces the pure 5-β-methyl-thio-ethyl-5-(1-methyl)-n-propyl-2-thio-barbituric acid having a melting point of 113° C.

To manufacture the sodium salt 15 grams of the barbituric acid are shaken up (in a shaking machine) with 55 cc. of normal caustic soda for one hour. The filtered solution is concentrated in vacuum and the residue is recrystallized from isopropanol.

EXAMPLE 3

5-β-methyl-thio-ethyl-5-(1-methyl)-n-butyl-barbituric acid

This compound has the structural formula of Formula I wherein: R is $CH_3$—$CH_2$—$CH_2$, X is H, and Y is O.

A solution of 38 grams of sodium in 760 cc. of absolute alcohol is combined with 300 grams of (1-methyl)-n-butyl-cyano-acetic acid ethyl ester. The mixture is mixed dropwise and while being stirred at a temperature of 70° C. with 182 grams of β-methyl-mercapto-ethyl chloride, subsequently boiled for six hours under reflux and concentrated under vacuum. The residue is taken up in ether, the ether solution repeatedly washed with water, dried, filtered and concentrated. The residue is fractionated under vacuum. Under a pressure of 0.6 mm. of mercury, β - methyl - thio - ethyl - (1 - methyl) - n - butyl - cyano - acetic acid ethyl ester passes over at 142°–145° C. as a colorless oil.

A solution of 6.3 grams of sodium in 118 cc. methanol is boiled for four hours under reflux with 24.7 grams of dried guanidine carbonate and 118 cc. of benzene. Without further heat 23.5 grams of β-methyl-thio-ethyl-(1-methyl)-n-butyl-cyano-acetic acid ethyl ester are so added that the reaction mixture remains mildly boiling. Finally the mixture is additionally boiled for three hours under reflux and while being stirred and concentrated under vacuum. The residue is mixed with 200 cc. of water and the ether is removed. The aqueous solution is stripped of the dissolved ether under vacuum and mixed with 35 cc. of 30% acetic acid while being stirred and cooled. The precipitated material is sucked off, washed with water and recrystallized from 50% alcohol whereby β-methyl-thio-ethyl-(1-methyl)-n-butyl-cyano-acetyl guanidine is obtained in the form of colorless crystals having a melting point of 262° C.

12 grams of this intermediate product are boiled for three hours under reflux with 120 cc. of 20% sulfuric acid. The undissolved material which has solidified after cooling is sucked off, washed with water and recrystallized from 50% alcohol. The pure 5-β-methyl-thio-ethyl - 5 - (1 - methyl) - n - butyl - barbituric acid melts at 105° C.

EXAMPLE 4

5-β-methyl-thio-ethyl-5-(1-methyl)-n-butyl-2-thio-barbituric acid

This compound has the structural formula of Formula I wherein: R is $CH_3$—$CH_2$—$CH_2$—, X is H and Y is S.

A solution of 69 grams of sodium in 1380 cc. of absolute alcohol is mixed with 257.4 grams of β-methyl-thio-ethyl-(1-methyl)-n-butyl-cyano-acetic acid ethyl ester and 114 grams of thiourea and the whole mass boiled under reflux with stirring for six hours. After concentration under vacuum the residue is taken up in 1.5 liters of water and shaken up thrice, each time with 300 cc., of ether. The aqueous alcoholic layer is stripped, under vacuum, of the dissolved ether and mixed with 300 cc. of 30% acetic acid under stirring and ice cooling. The precipitated material is sucked off, washed with water, dried and recrystallized from isopropyl alcohol. The thus obtained β-methyl-thio-ethyl-(1-methyl)-n-butyl-cyano-acetyl thiourea forms yellowish green crystals having a melting point of 229° to 230° C.

100 grams of this product are boiled under reflux for three hours with 1 liter of 20% sulfuric acid. After cooling the mixture is taken up in ether, the ether solution washed with water, dried, filtered, concentrated and drawn off under vacuum. The residue is caused to crystallize by treatment with a mixture of 60 volume parts of methanol and 40 volume parts of petroleum benzene. The isolated crystals are recrystallized from the mentioned solvent mixture and yield thereby 5-β-methyl-thio-ethyl-5-(1-methyl)-n-butyl-2-thio-barbituric acid having a melting point of 79°–81° C.

20 grams of the free acid are shaken up (in a machine) for one hour with 69.5 cc. n/1 (normal) caustic soda. The filtered solution is concentrated under vacuum, the residue is taken up in absolute alcohol and again withdrawn under vacuum. After two recrystallizations of the residue from isopropyl alcohol one obtains the readily water-soluble, analytically pure, sodium salt of the 5-β-methyl-thio-ethyl-5-(1-methyl)-n-butyl-2-thio-barbituric acid.

EXAMPLE 5

5-β-methyl-thio-ethyl-5-(1-methyl)-isoamyl-barbituric acid

This compound has the structural formula of Formula I wherein: R is

X is H, and Y is O.

A solution of 44.5 grams of sodium in 890 cc. of absolute alcohol is mixed with 382 grams of (1-methyl)-isoamyl-cyano-acetic acid ethyl ester under stirring and warmed to 70° C. Then 236 grams of β-methyl-mercapto-ethyl chloride are so introduced that the continuously stirred reaction mixture mildly boils. Subsequently the mixture is additionally boiled under reflux with stirring for six hours and then concentrated under vacuum. The residue is dissolved in ether, the ethereal solution washed with water, dried over sodium sulfate, filtered, concentrated and removed under vacuum. The residue is fractionated under vacuum whereby the β-methyl-thio-ethyl-(1-methyl)-isoamyl-cyano-acetic acid ethyl ester passes over at a pressure of 0.15 mm. of mercury at 147°–149° C.

A solution of 34.5 grams of sodium in 690 cc. of absolute alcohol is boiled under reflux and with stirring for eight hours with 136 grams of β-methyl-thio-ethyl-(1-methyl)-isoamyl-cyano-acetic acid ethyl ester and 45 grams of urea and then concentrated under vacuum. The residue is dissolved in 900 cc. of water and extracted with ether. The aqueous alkaline layer is freed of dissolved ether under vacuum and mixed with 300 cc. of 30% acetic acid while being stirred and ice cooled. The resulting precipitate is sucked off, washed with water and recrystallized from alcohol.

25 grams of the intermediate product thus obtained, which melts at 238°–240° C., is boiled under reflux for three hours with 250 cc. of 20% sulfuric acid whereby the material dissolves completely. After cooling the oily layer is taken up in ether, the ether solution washed with water, dried, filtered, concentrated and withdrawn under vacuum. The residue upon recrystallization from alcohol yields the pure 5-β-methyl-thio-ethyl-5-(1-methyl)-iso-amyl-barbituric acid having a melting point of 146° C.

2 grams of that barbituric acid are dissolved in 10 cc. of a 30% aqueous solution of trimethylamine. After concentration of this solution under vacuum there is left the trimethylamine salt of that barbituric acid which is readily soluble in water. An aqueous solution of this salt in concentration of 10% has a pH of 10.

EXAMPLE 6

5-β-methyl-thio-ethyl-5-(1-methyl)-isoamyl-2-thio-barbituric acid

This compound has the structural formula of Formula I wherein: R is

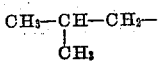

X is H, and Y is S.

If one in Example 5 replaces 45 grams of urea by 57.1 grams of thiourea and works up the mass in a completely analogous manner one obtains the β-methyl-thio-ethyl-(1-methyl)-isoamyl-cyano-acetyl-thiourea which can be recrystallized from alcohol and melts at 235°–236° C. 30 grams of this product are boiled under reflux with stirring with 300 cc. of 20% sulfuric acid. After cooling the undissolved material is sucked off, washed with water and recrystallized from alcohol. The 5-β-methyl-thio-ethyl-5-(1-methyl)-isoamyl-2-thio-barbituric acid forms light green crystals having a melting point of 143° C. The sodium salt thereof prepared in conventional manner crystallizes from isopropyl alcohol in form of nearly colorless compact aggregates.

EXAMPLE 7

5-β-methyl-thio-ethyl-5-(1-methyl)-n-butyl-3-methyl-barbituric acid

This compound has the structural formula of Formula I wherein: R is $CH_3$—$CH_2$—$CH_2$—, X is $CH_3$—, and Y is O.

A solution of 34.5 grams of sodium in 690 cc. of absolute alcohol is mixed with 128.7 grams of β-methyl-thio-ethyl-(1-methyl)-n-butyl-cyano-acetic acid ethyl ester and after addition of 55.5 grams of methyl urea, boiled under reflux with stirring for eight hours. The reaction mixture is concentrated under vacuum and the residue is dissolved in 1260 cc. of water and exhaustively extracted with ether. The aqueous alkaline solution is mixed with 300 cc. of 30% acetic acid, and the resultant smeary precipitate taken up in ether. The ether solution is washed with water, dried and concentrated. The result is the β-methyl-thio-ethyl-(1-methyl)-n-butyl-cyano-acetyl-methylurea which is recrystallized from benzene.

370 cc. of 20% sulfuric acid are poured over 37 grams of this product whereby most of it is dissolved. When warmed all of it is dissolved. The mixture is then boiled under reflux for three hours whereby the barbituric acid is precipitated first in oily form and crystallizes later on.

After cooling the 5-β-methyl-thio-ethyl-5-(1-methyl)-n-butyl-3-methyl-barbituric acid is sucked off, washed with water, dried and recrystallized from absolute alcohol in the form of colorless crystals having a melting point of 130° C. The sodium salt which is prepared by the reaction of the acid with caustic soda is crystallized from boiling benzene.

EXAMPLE 8

5-β-methyl-thio-ethyl-5-(1-methyl)-n-butyl-3-methyl-2-thio-barbituric acid

This compound has the structural formula of Formula I wherein: R is $CH_3$—$CH_2$—$CH_2$—, X is $CH_3$—, and Y is S.

A solution of 42 grams of sodium in 840 cc. of absolute alcohol is mixed with 156.5 grams of β-methyl-thio-ethyl-(1-methyl)-n-butyl-cyano-acetic acid ethyl ester, and after the addition of 82 grams of N-methyl-thiourea boiled under reflux with stirring for eight hours. The further manipulation is carried in accordance with the procedure of Example 7. The β-methyl-thio-ethyl-(1-methyl)-n-butyl-cyano-acetyl-methyl thiourea is first recrystallized from isopropyl alcohol and then recrystallized from alcohol. It melts at 105° C.

This product is converted into the 5-β-methyl-thio-ethyl-5-(1-methyl)-n-butyl-3-methyl-2-thio-barbituric acid by boiling for three hours with 10 volumes of 20% sulfuric acid. This product, when recrystallized from absolute alcohol has a melting point of 84°–85° C.

EXAMPLE 9

*5-β-methyl-thio-ethyl-5-(1-methyl)-n-propyl-3-methyl-barbituric acid*

This compound has the structural formula of Formula I wherein: R is $CH_3-CH_2$, X is $CH_3$ and Y is O.

A solution of 34.5 grams of sodium in 690 cc. of absolute alcohol is mixed with 122 grams of β-methyl-thio-ethyl-(1-methyl)-n-propyl-cyano-acetic acid ethyl ester, and after the addition of 55.5 grams of methyl-urea boiled under reflux with stirring for eight hours. The reaction mixture is concentrated under vacuum and the residue is dissolved in 900 cc. of water and exhaustively extracted with ether. The aqueous alkaline solution is freed of dissolved ether under vacuum and mixed with 500 cc. of 30% acetic acid while being stirred and ice cooled. The precipitated material is sucked off, washed with water and recrystallized from alcohol. The thus obtained pure β-methyl - thio - ethyl - (1 - methyl) - n - propyl - cyano-acetyl-methyl-urea has a melting point of 115° C.

30 grams of this intermediate product are boiled under reflux for 3 hours with 300 cc. of 20% sulfuric acid. After cooling the oily layer is taken up in ether, the ether solution washed with water, dried over sodium sulfate, filtered, concentrated and withdrawn under vacuum. The oily residue is caused to crystallize by treatment with 3 parts of hot 50% alcohol. Further purification is obtained by recrystallization from methanol whereby the 5-β-methyl-thio-ethyl-(1-methyl)-n-propyl-3-methyl-barbituric acid forms colorless crystals having a melting point of 89–90° C. The thus obtained crystals are difficultly soluble in water.

20 grams of the free acid are shaken up (in a machine) for one hour with 29.4 cc. n/1 (normal) caustic soda. The filtered solution is dried in vacuum and yields thereby a colorless readily water-soluble powder of the sodium salt of 5-β-methyl-thio-ethyl-(1-methyl)-n-propyl-3-methyl-barbituric acid.

It will be understood that the foregoing description of the invention and the examples thereof set forth are merely illustrative of the principles thereof. Accordingly, the appended claims are to be construed as defining the invention within the full spirit and scope thereof.

We claim:

1. Compounds of the group consisting of substituted barbituric acids and thiobarbituric acids and the non-toxic, anionic salts thereof in which the free acid form has the structure $$\begin{array}{c} CH_3.S.CH_2.CH_2 \quad CO-NX \\ \diagdown \quad | \quad | \\ C \quad C=Y \\ \diagup \quad | \quad | \\ R-CH \quad CO-NH \\ | \\ CH_3 \end{array}$$

wherein: R is an alkyl radical having from 2 to 4 carbon atoms;
X is a member of the group consisting of hydrogen and methyl;
Y is a member of the group consisting of oxygen and sulfur.

2. 5 - β - methyl - thio - ethyl - 5 - alkyl - 2 - thio-barbituric acids of the formula $$\begin{array}{c} CH_3.S.CH_2.CH_2 \quad CO-NH \\ \diagdown \quad | \quad | \\ C \quad C=S \\ \diagup \quad | \quad | \\ R-CH \quad CO-NH \\ | \\ CH_3 \end{array}$$

wherein: R is an alkyl radical having from 2 to 4 carbon atoms, said acids being colorless or weakly colored compounds which are soluble in hot benzene or alcohol, difficultly soluble in cold water and readily soluble in dilute solutions of sodium hydroxide.

3. 5 - β - methyl - thio - ethyl - 5 - alkyl - 2 - thio - barbituric acids in accordance with claim 2 wherein R is a straight-chain alkyl radical.

4. 5 - β - methyl - thio - ethyl - 5 - (1 - methyl) - n-propyl-2-thio-barbituric acid of the formula $C_{11}H_{18}O_2N_2S_2$ having a melting point of 113° C.

5. 5 - β - methyl - thio - ethyl - 5 - (1 - methyl) - n-butyl-2-thio-barbituric acid of the formula $C_{12}H_{20}O_2N_2S_2$ having a melting point of about 79°–81° C.

6. 5 - β - methyl - thio - ethyl - 5 - alkyl - 2 - thio-barbituric acids in accordance with claim 2 wherein R is a branched alkyl radical having from 3 to 4 carbon atoms.

7. Non-toxic, anionic salts of the 5-β-methyl-thio-ethyl-5-alkyl-2-thio-barbituric acids, said acids having the formula $$\begin{array}{c} CH_3.S.CH_2.CH_2 \quad CO-NH \\ \diagdown \quad | \quad | \\ C \quad C=S \\ \diagup \quad | \quad | \\ R-CH \quad CO-NH \\ | \\ CH_3 \end{array}$$

wherein R is an alkyl radical having from 2 to 4 carbon atoms, said salts being colorless or weakly colored compounds that are readily soluble in water.

8. Sodium salts of 5-β-methyl-thio-ethyl-5-alkyl-2-thio-barbituric acids in accordance with claim 7, said salts being colorless or weakly colored compounds that are readily soluble in water and which can be recrystallized from isopropyl alcohol.

9. The sodium salt of 5-β-methyl-thio-ethyl-5-(1-methyl)-n-propyl-2-thio-barbituric acid, said compound being readily soluble in water and having the formula $C_{11}H_{17}O_2N_2S_2Na$.

10. The sodium salt of 5-β-methyl-thio-ethyl-5-(1-methyl)-n-butyl-2-thio-barbituric acid said compound being readily soluble in water and having the formula $C_{12}H_{19}O_2N_2S_2Na$.

11. Anionic salts of 5-β-methyl-thio-ethyl-5-alkyl-barbituric acids, said acids having the formula $$\begin{array}{c} CH_3-S-CH_2-CH_2 \quad CO-NCH_3 \\ \diagdown \quad | \quad | \\ C \quad C=O \\ \diagup \quad | \quad | \\ R-CH \quad CO-NH \\ | \\ CH_3 \end{array}$$

wherein R is an alkyl radical having from 2 to 4 carbon atoms, said salts being colorless compounds that are readily soluble in water.

12. Sodium salts of 5-β-methyl-thio-ethyl-5-alkyl-barbituric acids in accordance with claim 11, said salts being colorless compounds, that are readily soluble in water and which can be recrystallized from isopropyl alcohol.

13. 5 - β - methyl - thio - ethyl - 5 - alkyl - 3 - methyl-barbituric acid of the formula $$\begin{array}{c} CH_3-S-CH_2-CH_2 \quad CO-N-CH_3 \\ \diagdown \quad | \quad | \\ C \quad C=O \\ \diagup \quad | \quad | \\ R-CH \quad CO-NH \\ | \\ CH_3 \end{array}$$

wherein R is an alkyl radical having from 2 to 4 carbon atoms said acids being colorless compounds which are soluble in hot alcohol or methanol and difficultly soluble in water.

14. 5 - β - methyl - thio - ethyl - 5 - (1 - methyl) - n - butyl-3-methyl-barbituric acid, having a melting point of 130° C.

References Cited in the file of this patent

Walter et al.: J. Am. Chem. Soc. 67, 655–661 (1945).